(12) United States Patent
Amit et al.

(10) Patent No.: US 8,688,753 B2
(45) Date of Patent: Apr. 1, 2014

(54) TRANSFORMATION OF LOGICAL DATA OBJECTS FOR STORAGE

(75) Inventors: Jonathan Amit, Omer (IL); Chaim Koifman, Rishon Lezion (IL); Rostislav Raikhman, Rishon Lezion (IL)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 13/209,293

(22) Filed: Aug. 12, 2011

(65) Prior Publication Data

US 2011/0302219 A1 Dec. 8, 2011

Related U.S. Application Data

(63) Continuation of application No. 13/006,369, filed on Jan. 13, 2011.

(60) Provisional application No. 61/294,662, filed on Jan. 13, 2010.

(51) Int. Cl.
*G06F 17/30* (2006.01)
*G06F 7/00* (2006.01)

(52) U.S. Cl.
USPC ............................ 707/810; 707/802; 707/661

(58) Field of Classification Search
USPC .......................................... 707/802, 810, 661
See application file for complete search history.

(56) References Cited

U.S. PATENT DOCUMENTS

| | | | |
|---|---|---|---|
| 6,810,405 B1 * | 10/2004 | LaRue et al. .................. | 707/613 |
| 7,249,281 B2 * | 7/2007 | Shirley et al. ................... | 714/15 |
| 2001/0047360 A1 * | 11/2001 | Huras et al. .................... | 707/102 |
| 2004/0153576 A1 * | 8/2004 | Hansmann et al. ........... | 709/248 |
| 2008/0065596 A1 * | 3/2008 | Shadmon et al. ................ | 707/2 |
| 2008/0140705 A1 * | 6/2008 | Luo ........................... | 707/103 R |
| 2009/0106298 A1 * | 4/2009 | Furusho ........................ | 707/102 |
| 2009/0138503 A1 * | 5/2009 | Chowdhury ................ | 707/104.1 |
| 2009/0177622 A1 * | 7/2009 | Hu et al. ............................ | 707/2 |
| 2009/0222473 A1 * | 9/2009 | Chowdhury .................. | 707/102 |

FOREIGN PATENT DOCUMENTS

| | | | |
|---|---|---|---|
| WO | 2007/138600 | A2 | 12/2007 |
| WO | 2007/138601 | A2 | 12/2007 |
| WO | 2007138602 | A2 | 12/2007 |

* cited by examiner

*Primary Examiner* — Cam Truong
(74) *Attorney, Agent, or Firm* — Griffiths & Seaton PLLC (57) ABSTRACT

Various embodiments for operating a transformation system, capable of transforming a logical data object (LO) to a transformed logical data object (TLO), are provided. In one such embodiment, an open LO request to a certain LO and addressed by the at least one client to the at least one storage device, is intercepted. An identifier (ID) in a header of a TLO corresponding to the requested LO and stored in the at least one storage device, is obtained. The obtained ID is used to characterize the TLO and the LO. A determination is made whether the transformation system handles at least one open LO characterized by an ID with a same value as the obtained ID. The requested LO is opened if at least one open LO is not found. An instance corresponding to the intercepted open LO request is generated. The instance is associated to the obtained ID.

18 Claims, 7 Drawing Sheets

TRANSFORMATION OF LOGICAL DATA OBJECTS FOR STORAGE

CROSS-REFERENCE TO RELATED APPLICATION

This non-provisional application is a continuation of U.S. patent application Ser. No. 13/006,369, filed on Jan. 13, 2011, which claims the benefit under 35 U.S.C. §119(e) of U.S. Provisional Application No. 61/294,662, filed Jan. 13, 2010, each of which is incorporated herein by reference.

FIELD OF THE INVENTION

This invention relates to computing systems, and, in particular, to methods and systems capable of transforming logical data objects to be stored in computing systems and networks thereof.

BACKGROUND OF THE INVENTION

With increasing demand for faster, more powerful and more efficient ways to store information, optimization of storage technologies is becoming a key challenge.

Logical data objects (data files, image files, data blocks, etc.) may be transformed for transmission and/or storage purposes. The transformation may comprise compression, encryption, encoding, conversion, etc. and/or combinations thereof. For example, data compression techniques are used to reduce the amount of data to be stored or transmitted in order to reduce the storage capacity and transmission time respectively. Compression may be achieved by using different compression algorithms known in the art. Data stored in plaintext is further open to potential malicious use (e.g. unauthorized access, misuse, theft, etc.), and known in the art solutions for perimeter and/or access control (e.g. firewalls, Virtual Private Networks, LUN masking control and zoning in SAN storage networks, NAS security control features, etc.) still leave security vulnerabilities. Encrypting data to be stored may considerably reduce security threats; such encryption may be provided by using different algorithms known in the art. Encoding and/or converting the logical objects or parts thereof may, by way of non-limiting example, facilitate increased network reliability, effectiveness and/or flexibility (e.g. for mobile, broadcast, and video and similar applications).

SUMMARY OF THE INVENTION

Various challenges of compressing, compression with encrypting or other transforming data for storage and access to the stored transformed data have been recognized in the Prior Art. Accordingly, various systems have been developed to provide a solution, for example, International Applications WO2007138600, WO2007138601 and WO2007138602 published Dec. 12, 2007. The entire contents of said International Applications are hereby incorporated by reference in their entirety.

In accordance with certain aspects of the present invention, various embodiments for operating a transformation system operatively coupled to at least one client and at least one storage device and capable of transforming a logical data object (LO) to a transformed logical data object (TLO) for storage in the at least one storage device operable with at least one storage protocol, are provided.

In one such embodiment, by way of example only, an open LO request to a certain LO and addressed by the at least one client to the at least one storage device, is intercepted. In response to the intercepted open LO request, an identifier (ID) is obtained in a header of a TLO corresponding to the requested LO, and stored in the at least one storage device, thereby using the obtained ID to characterize the TLO and the LO. A determination is made whether the transformation system handles at least one open LO characterized by an ID with a same value as the obtained ID. The requested LO is opened if the at least one open LO is not found. An instance corresponding to the intercepted open LO request is generated. The instance is associated to the obtained ID.

In addition to the foregoing exemplary embodiment, other system and computer program product embodiments are disclosed and provide related advantages.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", "generating", "activating", "reading", "writing" or the like, refer to the action and/or processes of a computer that manipulate and/or transform data into other data, said data represented as physical, such as electronic, quantities and/or representing the physical objects. The term "computer" should be expansively construed to cover any kind of electronic device with data processing capabilities, including, by way of non-limiting example, personal computers, servers, computing system, communication devices, storage devices, processors (e.g. digital signal processor (DSP), microcontrollers, field programmable gate array (FPGA), application specific integrated circuit (ASIC), etc.) and other electronic computing devices.

The operations in accordance with the teachings herein may be performed by a computer specially constructed for the desired purposes or by a general purpose computer specially configured for the desired purpose by a computer program stored in a computer readable storage medium.

Embodiments of the present invention are not described with reference to any particular programming language. It will be appreciated that a variety of programming languages may be used to implement the teachings of the inventions as described herein.

The term "logical data object (LO)" used in this patent specification should be expansively construed to include any types and granularities of data units used in a computing system and handled as one unit (e.g. data files, archive files, image files, database files, memory data blocks, stream data blocks, predefined segments of files, etc.).

Figure 1:
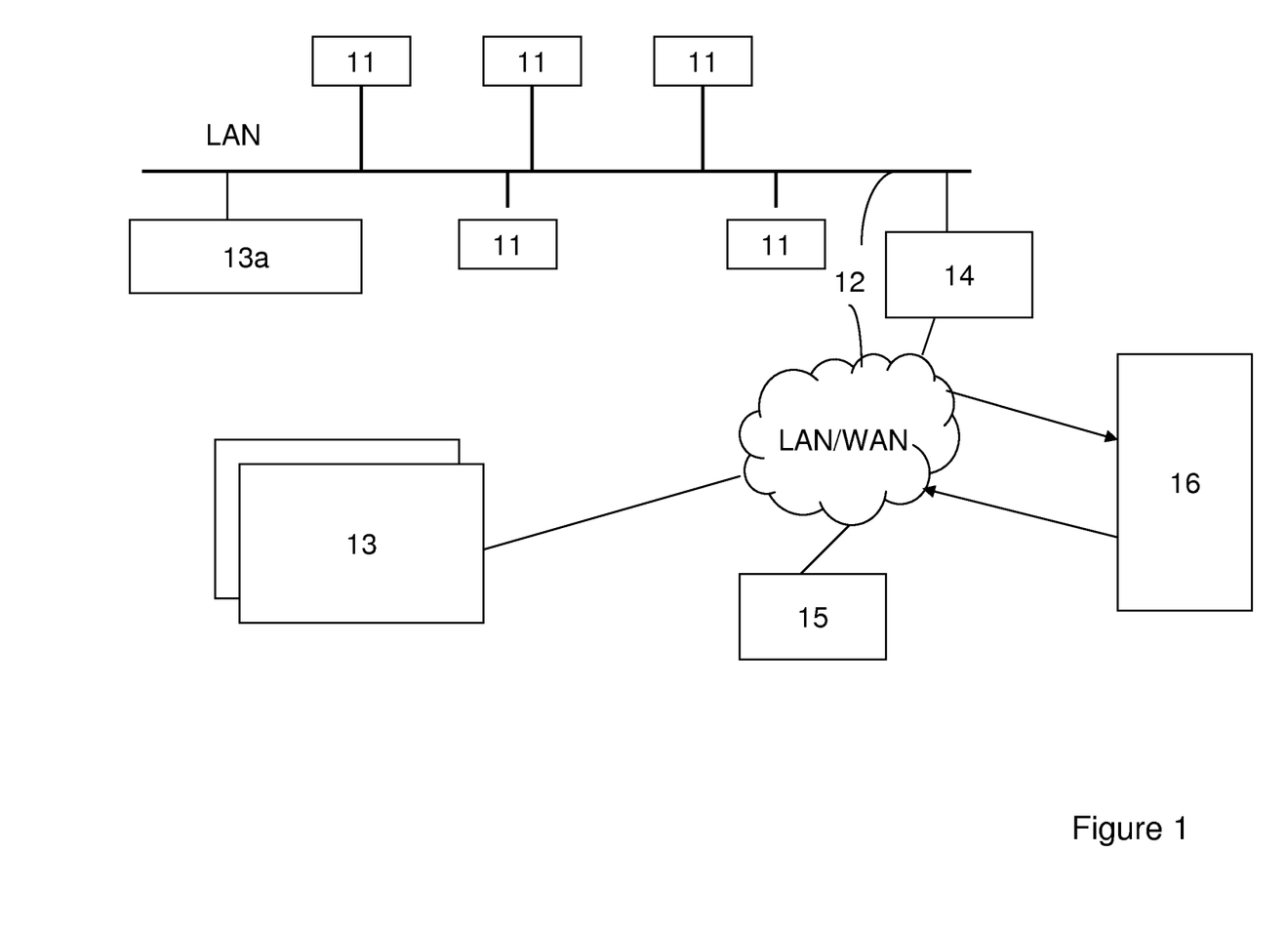
FIG. 1 illustrates a schematic block diagram of storage network architecture applicable to certain embodiments of the present invention.

Bearing this in mind, attention is drawn to FIG. 1 illustrating a schematic diagram of storage network architecture applicable to certain embodiments of the present invention. The logical data objects (LO) from clients (workstations, application servers, etc.) 11 are transferred via a network 12 to storage device(s) 13 (e.g. specialized NAS file servers, general purpose file servers, SAN storage, stream storage device, etc.) and/or 13a. The network comprises one or more communication devices 14 (e.g. switch, router, bridge, etc.) facilitating the data transfer. The storage in the illustrated network may be wholly or partly implemented using block mode access and/or file mode access storage protocols. In file mode access the logical data objects (LOs) are constituted by files, and the network is IP network (e.g. local area network (LAN), wide area network (WAN), combination thereof, etc.). In block mode access embodiments, the logical data objects are constituted by data blocks and the network is Storage Area Network (SAN) implementing, for example, Fiber Channel or iSCSI protocols. In certain embodiments clients may be directly connected to the storage device (13a) via LAN part of the network 12, e.g. via block mode access storage protocols as SCSI, Fiber Channel, etc. Such Direct Access Storage may include, for example, the internally attached local disk drives or externally attached RAID (redundant array of independent disks) or JBOD (just a bunch of disks), etc.

At least part of the logical data objects (LOs) may be stored in a transformed form (e.g. a compressed form and/or an encrypted form). The transformation or part thereof may be provided by a transformation system 16 operatively coupled to the clients and to the storage device(s) and configured to intercept LO call operations (LO access-related requests) as well as some control transactions and to act as a proxy on certain transactions. By way of non-limiting example, the transformation system may be configured to transfer such control-related requests as format disk, de-fragment disk, take a snapshot, etc. between the client and the storage device in a transparent manner, while intervening in data access-related transactions (e.g. read, write, etc.) and some control related transactions (e.g. capacity status, set end of LO, etc.)

The transformation system 16 is capable of deriving and processing data corresponding to the intercepted LO access-related request, facilitating, when appropriate, communication with and/or within the file system for storing the processed data at the storage medium as at least one transformed LO. As would be appreciated by one of ordinary skill in the art, the transformation system (and as will be further described, the transformation unit incorporated into such transformation system) may make use of various hardware components, such as central processing units (CPUs), controllers, and other processing devices to perform functionality as will be further described in the illustrated embodiments and following claimed subject matter.

In one embodiment, during "write" operation on the LO to be processed for storage, the transformation system 16 receives from the clients 11 through the network 12 data corresponding to said LO, transforms the data and facilitates writing at the storage device 13. A "read" operation proceeds in reverse direction; the required LO is retrieved by the transformation system, de-transformed (partly or entirely, in accordance with required data range and implemented transformation technique) and sent to the appropriate client.

Typically the secure keys used for encryption (if required) are held separately from the device providing encryption and/or storage, for example, they may be held at a key holding platform 15 operatively coupled with the transformation system 16. Likewise, coding tables and similar external data involved in the transformation process may be held separate from the processing and/or storage devices. When appropriate, the transformation system is capable to communicate with the external platform (e.g. keys holding platform 15) for obtaining external data involved in the transformation process (e.g. secure keys and/or secure values or other metadata thereof involved in the transformation).

Non-limiting examples of the transformation system 16 are disclosed in International Applications WO2007138600, WO2007138601 and WO2007138602 published Dec. 12, 2007 and assigned to the assignee of the present application.

Note that the invention is not bound by the specific architecture described with reference to FIG. 1. For purpose of illustration only, the following description is made with respect to processing by the transformation system 16 the logical data objects to be stored at the storage device, writing the processed data to the storage device 13, reading the data to be de-transformed (e.g. decrypted, decompressed, etc.) from the storage device, and de-transforming them by the transformation system 16. Those versed in the art will readily appreciate that the invention is, likewise, applicable to any purpose device adapted to implement the teachings of the present invention and operatively located on a physical and/or logical route between a client sending a data access request to the logical data object and a storage location of the appropriate data, including embodiments wherein the transformation system is integrated, fully or partly, with the communication device, workstation, application server and/or storage device.

Also it should be noted that the invention is, likewise, applicable to writing the processed data in a memory of any device on said route and later forwarding the entire transformed LO or parts thereof for storing at a storage location, as well as for forwarding the transformed data to be read from the storage location to any device on the route and further de-transformation.

Figure 2:
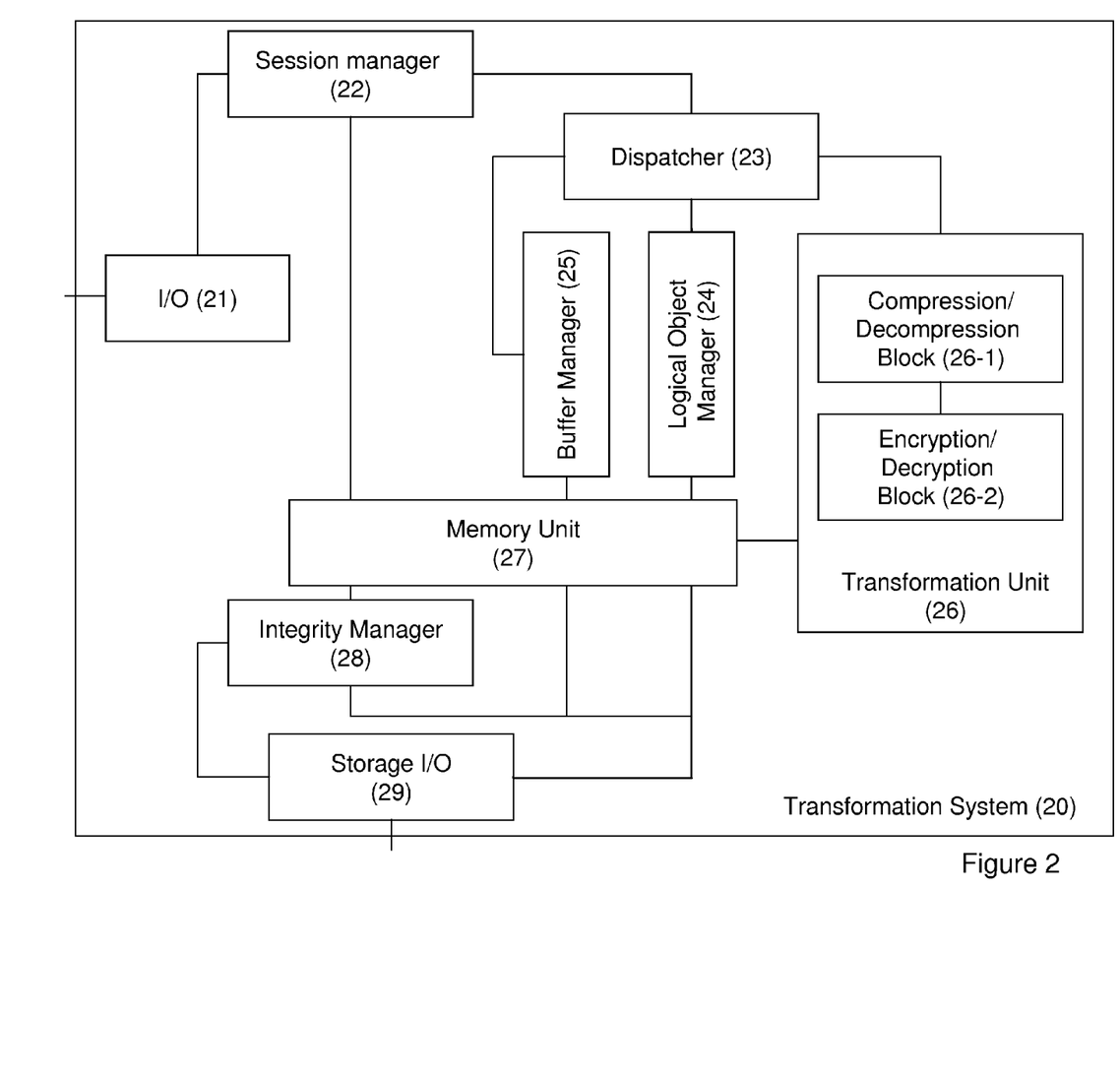
FIG. 2 illustrates a schematic functional block diagram of the transformation system in accordance with certain embodiments of the present invention.

FIG. 2 illustrates a schematic functional block diagram of the transformation system 20 in accordance with certain embodiments of the present invention. The transformation system comprises a Client Input/Output (I/O) block 21 coupled to a session manager 22. The client I/O block gets data access-related requests (e.g. read, write, set end of LO/truncate, etc.) from external clients and forwards them to the session manager.

A session starts by access request to a logical data object (e.g. LUN capacity request as, for example, SCSI LUN capacity request command; open file request, etc.) and ends by disconnect request (e.g. "LUN disconnect", "close file", etc.) received from the same IP address (user) with regard to the same logical data object. As will be further detailed with reference to FIGS. 3-5, the session may handle one or more access requests addressed to the same logical data object (e.g. from multiple applications running on the same client, multiple requests from certain single applications, etc.). The session manager is further configured to manage one or more sessions with access requests addressed to the same logical data object as will be further described with reference to FIGS. 3-5.

The session manager 22 is adapted to derive and/or generate session-related data (e.g. source session address, session counters, session status, relevant instances, etc.) and to hold the respective data in a memory unit 27. The session manager also handles blocking relevant resources when the logical data object is open and releasing said resources on disconnect.

The session manager transfers all access-related requests to a dispatcher 23 operatively coupled to the session manager. The dispatcher 23 is operatively coupled to a logical data object manager 24, a buffer manager 25 and a transformation unit 26. The dispatcher 133 communicates with the logical data object manager 24 for data related transactions (e.g. Read, Write, set end of LO, etc.) and the transformation unit 26 for transforming operations in accordance with certain embodiments of the present invention.

The transformation unit is further operatively coupled to the memory unit 27 and is capable of compressing, encrypting and/or otherwise transforming data, and of enabling sending it to a physical disk for storage (e.g. at storage device 13) through a storage I/O 29. The transformation unit is also capable of reading data received from the physical disk through the storage I/O, de-transforming (e.g. decrypting and/or decompressing) the respective buffer and facilitating further processing of the de-transformed data. The transformation unit may comprise one or more transformation blocks responsible for certain transforming operations (e.g. compression-decompression block 26-1, encryption/decryption block 26-2, etc.) and is configured to facilitate data transfer and necessary synchronization between the blocks. The transformation unit is also configured to report size of original logical data object (and free storage capacity) in reply to "Capacity status" and similar reports.

The transformation unit 26 may be further configured to communicate with one or more external platforms storing external information related to data involved in the transformation process (e.g. coding tables, secure keys, metadata thereof, etc.); to receive information, extract or generate the necessary data (e.g. key ID) and to manage thereof. The received information may be temporarily accommodated in a trusted memory within the transformation system, wherein the transformation unit block may provide a management of said information (e.g. to manage accommodation of certain keys in said memory for a certain time period in accordance with a certain policy). In certain embodiments of the invention the encryption/decryption block 26-2 may further generate one or more encryption initialization vectors to be used for encryption (e.g. together with secure keys).

The logical object manager 24 is further operatively coupled to the memory unit 27 and is responsible for the ordering and memory sharing by different logical data objects and parts thereof. As will be further detailed with reference to FIGS. 3-5, the logical object manager is further involved in handling multiple access requests addressed to the same logical data object.

The buffer manager 25 is further operatively coupled to the memory unit 27, is configured to manage memory buffer resources, and is responsible for allocating and releasing memory buffer for operations of other blocks. The transformation system further comprises an integrity manager 28 operatively coupled to the session manager, the buffer manager and the data block manager. The integrity manager is responsible for synchronization and general control of all processes in the transformation system as, for example keeping the integrity of the logical data objects, etc. It is also responsible for flashing the memory buffer to the physical disk(s) through the storage physical I/O interface 29, and reading when needed from the disk(s).

Those of ordinary skill in the art will readily appreciate that the invention is not bound by the configuration of FIG. 2; equivalent and/or modified functionality may be consolidated or divided in another manner and may be implemented in software, firmware, hardware, or any combination thereof. Here again, the transformation unit 26 may include or may incorporate various processing components previously mentioned.

Figure 3:
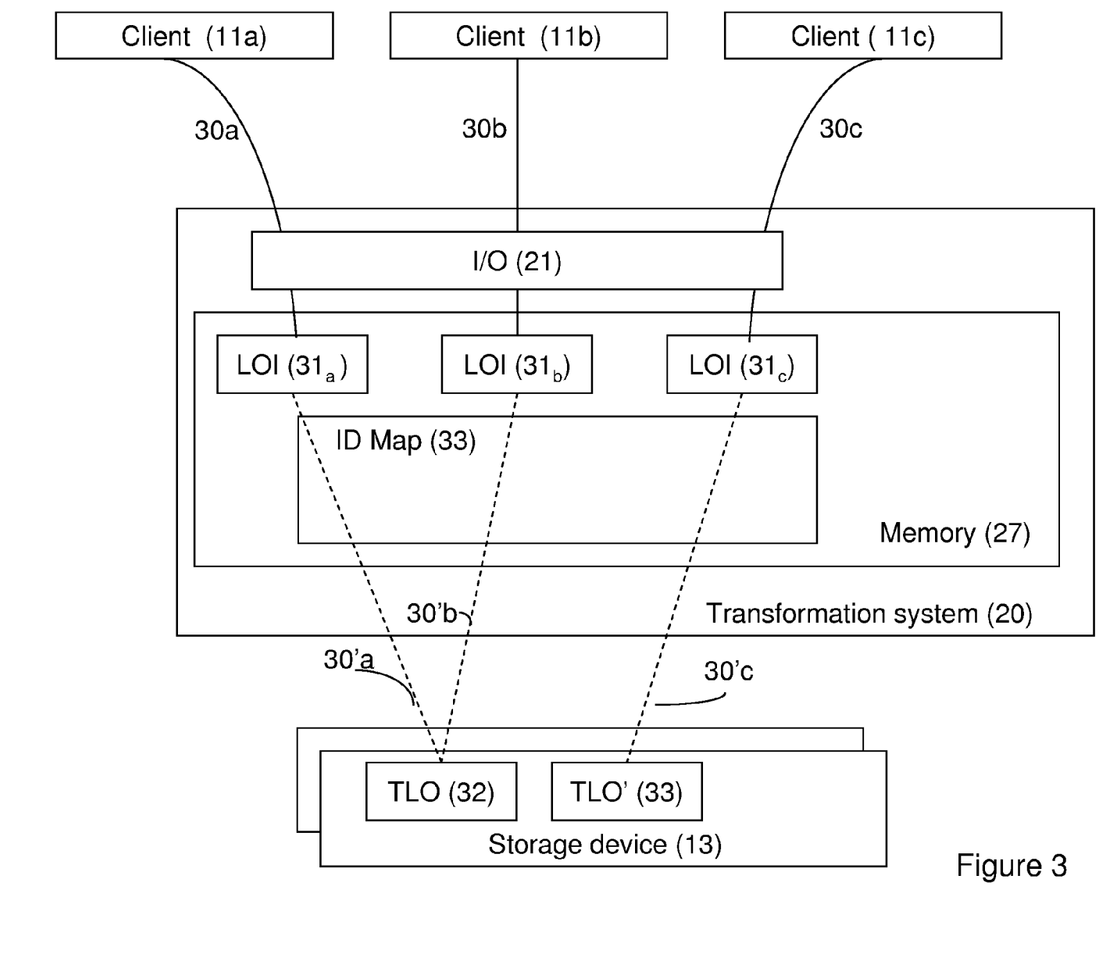
FIG. 3 illustrates a schematic diagram of multiple access-related requests in accordance with certain embodiments of the present invention.

Referring to FIG. 3, there is illustrated a schematic diagram of multiple access requests in accordance with certain embodiments of the present invention. For purpose of illustration only, the description is made with respect to concurrent requests from separate clients. It should be noted that the invention is not bound by requests from different clients and is, likewise, applicable to concurrent requests from the same client sent by multiple applications and/or within the same applications.

The transformation system 20 is connected to multiple clients (illustrated as 11a, 11b, 11c) via client I/O interface 21 and to one or more storage devices 13 via storage I/O interface 29. The connection to the clients and/or the storage devices may be provided via LAN/WAN network. The clients 11a and 11b concurrently and independently send respective access-related requests (illustrated as 30a, 30b) to the same logical data object stored in the storage device 13 as a transformed logical data object (TLO) 32. The client 11c concurrently sends access-related request illustrated as 30c to another logical data object stored in the storage device 13 as a transformed logical data object (TLO) 33.

In accordance with certain embodiments of the invention each transformed logical data object comprises a header; said header accommodates unique identification (ID) of the transformed logical data object. The ID may be generated by the transformation system when creating the transformed LO and, optionally, may be further modified as detailed with reference to FIGS. 4-5. The transformation system generates ID in a manner facilitating one-to-one relationship between a logical data object and respective transformed logical data object generated by the transformation system. Accordingly, ID comprised in the header of generated TLO characterizes also the respective logical data object. ID of the transformed logical data object may be generated in accordance with one or more parameters characterizing the logical data object, and selection of such parameters may depend on a storage protocol. By way of non-limiting example, ID for transformed logical data objects stored per CIFS storage protocol may be generated in accordance with time of generation, CIFS command parameters (e.g. tid, pid, uid, mid) and file name; for NFS storage protocol the ID may be generated in accordance with time of generation, NFS File-Handle, NFS FSID—FileSystemID and NFS FileID; for SCSI protocol the ID may be generated in accordance with DeviceID characterizing a respective LUN.

However, certain operations on the stored LOs (e.g. snapshots, backup, restore, etc.) provided in a manner by-passing the transformation system may lead to two or more stored transformed logical data objects having the same ID. By way of non-limiting example, TLOs 32 and 33 may correspond to different LOs having the same ID (e.g. TLO 32 has been created by transformation system and TLO 33 is resulted from restoring TLO 32 with no involvement of the transformation system).

Figure 4:
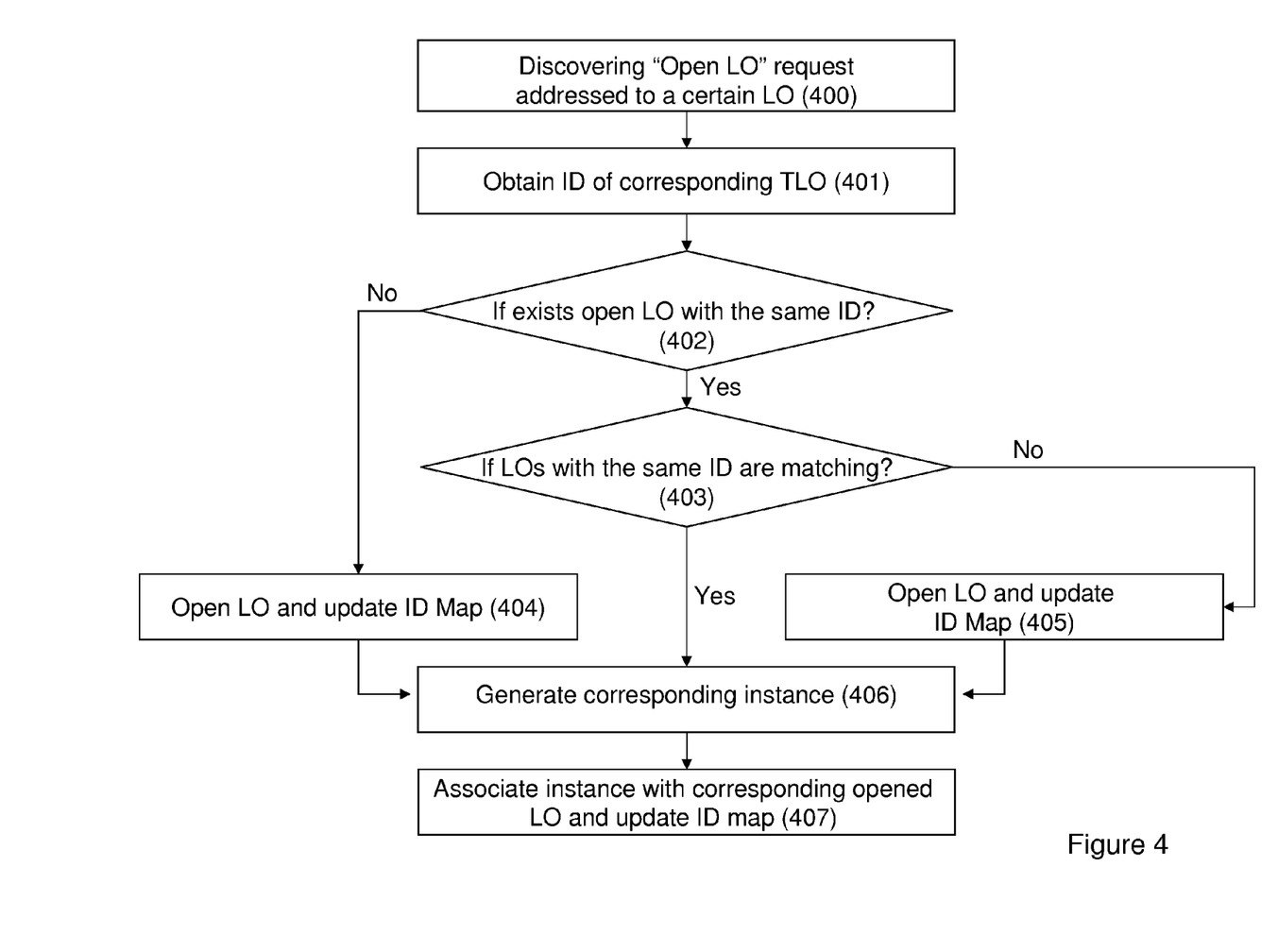
FIG. 4 illustrates a generalized flowchart of handling an access-related request in accordance with certain embodiments of the present invention.
Figure 5A:
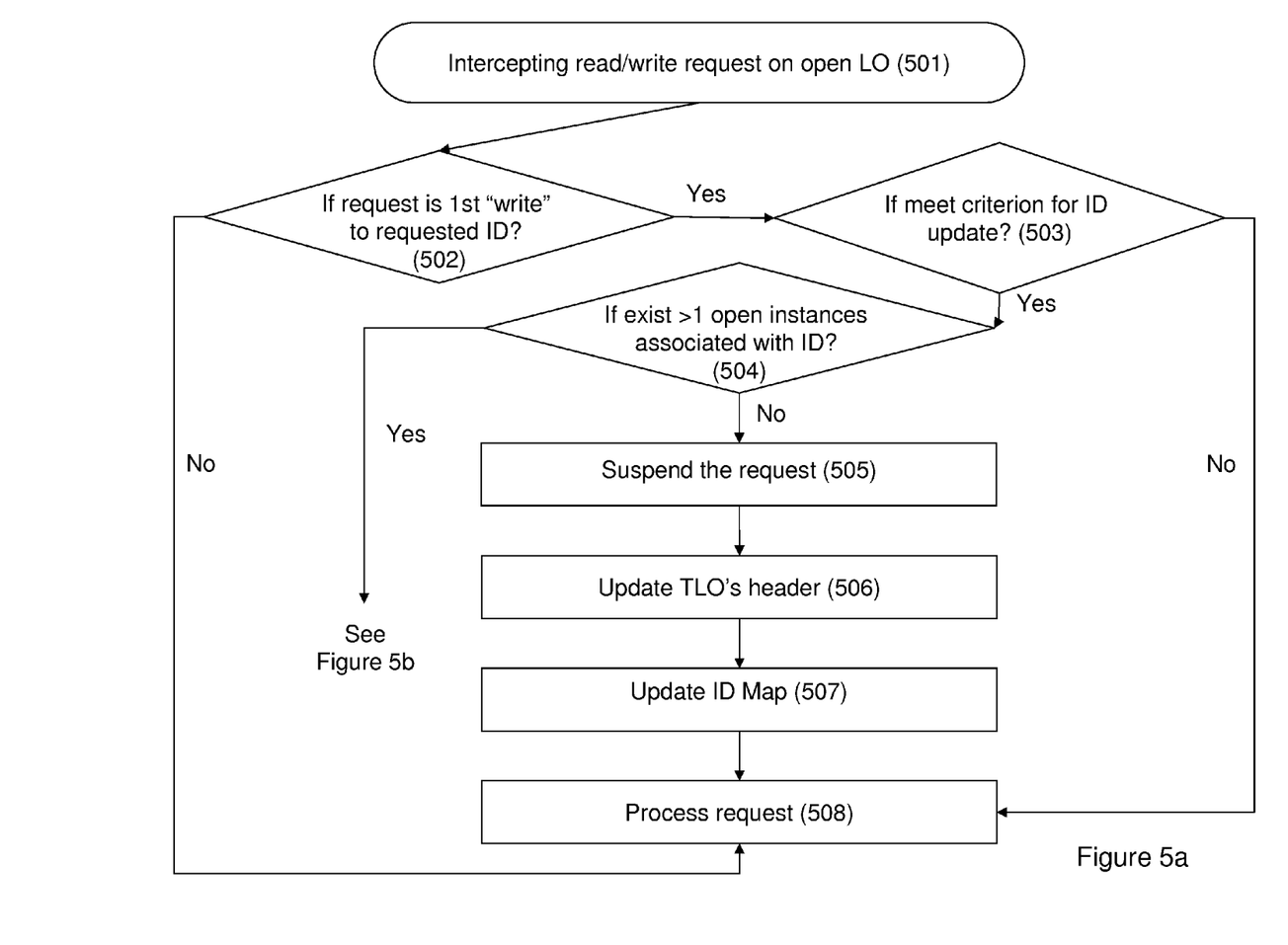
FIGS. 5a-5b illustrate a generalized flowchart of further handling an access-related request in accordance with certain embodiments of the present invention.
Figure 5B:
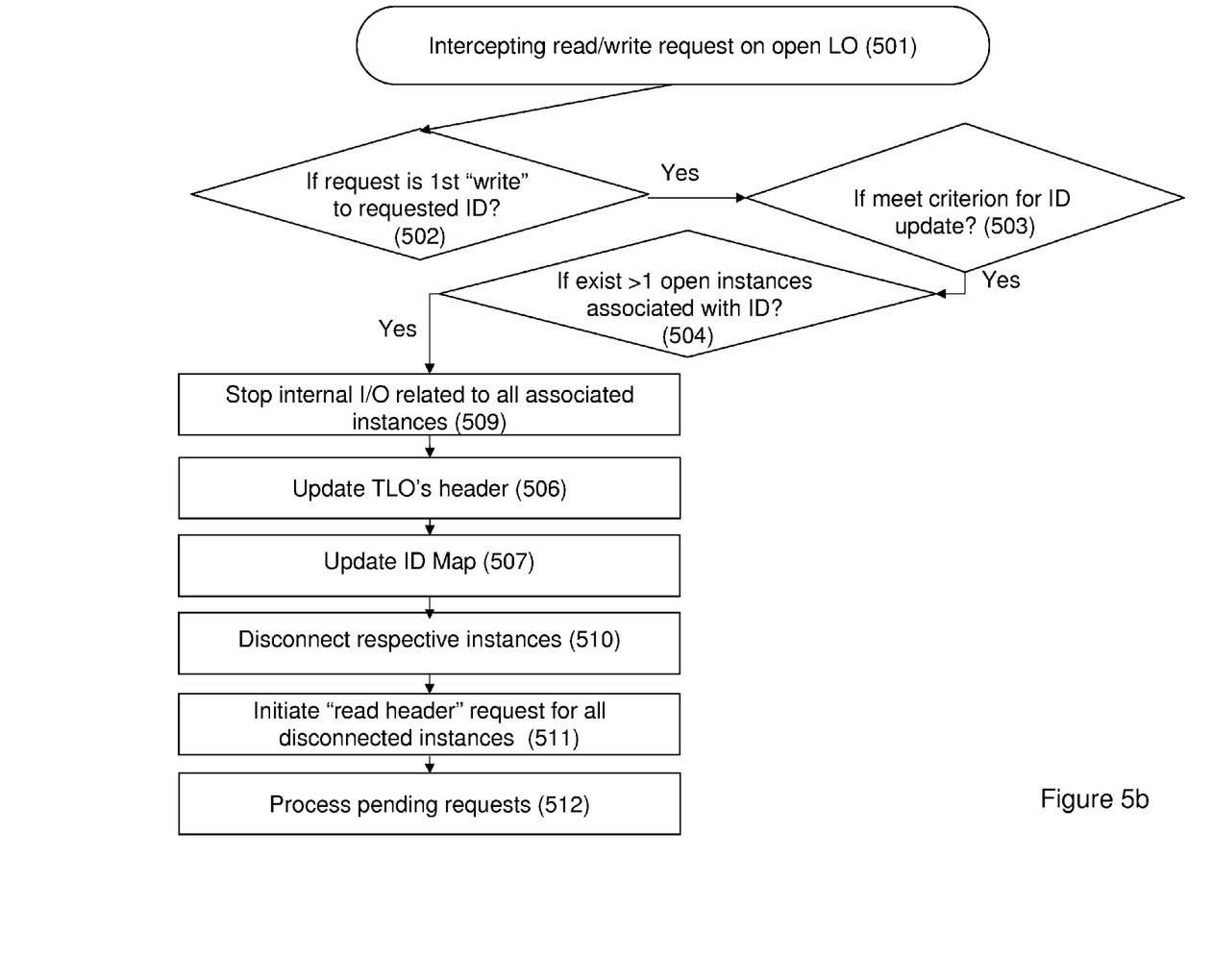

The transformation system 20 intercepts the access-related requests to a certain logical object, and examines the request to discover if the intercepted request requires opening a corresponding LO (e.g., the transformation system may recognize "open file" handle in an NFS request, "open file" request in SCSI protocol, etc.). The requests requiring opening a corresponding LO are referred to hereinafter as "open LO requests." The transformation system further sends corresponding "open LO" requests (illustrated as 30'$a$, 30'$b$, 30'$c$) to the respective transformed logical data object and, as will be further detailed with reference to FIGS. 4-5, provides for each such intercepted request corresponding instance (LOI) of the logical data object illustrated as 31$a$, 31$b$, 31$c$. The instance comprises requested LO or part thereof (i.e. de-transformed TLO or part thereof).

Each provided instance of a logical data object is associated with the ID of corresponding transformed LO. Such association may be provided, for example, with the help of ID Map 33. The ID Map is configured to hold information of all open LOs as well as of all instances opened in the memory, and to map all open instances to IDs characterizing open logical data objects. The ID Map may be handled by the Logical Object Manager 24.

Referring to FIG. 4, there is illustrated a generalized flow chart of handling an access-related request in accordance with certain embodiments of the present invention.

Upon intercepting an access-related request with regard to a certain logical data object and discovering an "open LO request" (400), the transformation system identifies (401) a transformed logical data object corresponding to said certain LO and obtains ID from the header of said transformed LO. The transformation system further checks (402) in the ID Map if there exists an open LO with the same ID. If there is no open LO with requested ID, the transformation system opens (404) the LO and updates the ID Map with the respective ID.

As was detailed with reference to FIG. 3, in some circumstances ID generated during the TLO creation may be not enough to distinguish between TLOs (and, accordingly, LOs). Accordingly, if there is already a LO open with the same ID, the transformation system checks (403) if the requested LO and the open LO are substantially identical. In accordance with certain embodiments of the present invention, the transformation system compares time attributes of LOs with the same ID. By way of non-limiting example, the transformation system may compare last-modify-time (T1) of TLO corresponding to the requested LO with last-modify-time of opening (T2) the currently open LO with the same ID. The transformation system considers the LOs with the same ID as substantially identical (referred to thereinafter as "matching") if the absolute value of a difference between these two times is less than a modify time threshold (MTT), i.e. |T1-T2|<(MTT). The modify time threshold is configurable and may depend on a storage protocol (e.g. for NFS protocol MTT may be based on NFS "CloseFileTO" parameter). By way of non-limiting example, the MTT may vary from minimum 40 seconds to maximum 130 seconds.

If the LOs with the same ID are non-matching, the transformation system opens (405) a new LO and updates the ID Map by adding ID as a separate entry, thus ID Map will comprise more than one LO characterized by the same ID. Handling non-matching LO with the same ID will be further detailed with reference to FIG. 5.

Upon creating (during 404 or 405) or identifying (during 403) respective ID in the ID map, the transformation system generates (406) an instance (e.g. by de-transforming the TLO or part thereof, by obtaining previously de-transformed data from a memory, etc.) corresponding to said certain access-related request, associates (407) the generated instance with ID of respective open LO and updates the IP Map accordingly.

Referring to FIGS. 5$a$ and 5$b$, there is illustrated a generalized flowchart of further handling the intercepted access-related request. In accordance with certain embodiments of the present invention, upon intercepting a read/write request (501) on certain LO opened as described with reference to FIG. 4, the transformation system checks (502) if the intercepted request is a first write request to the respective ID and connects the request to a respective instance (referred to hereinafter as "requested instance"). In a case of the first write request to the respective ID, the transformation system checks (503) if the intercepted request meets an ID update criterion. If the request is not a first write request to the respective ID and/or if the request does not meet the ID update criterion, the transformation system facilitates read/write operations in a manner detailed with reference to FIG. 1. Those versed in the art will readily appreciate that, depending on a protocol, read/write requests may be intercepted together with "open LO" request or afterwards.

The ID update criterion may be configured in different manners. By way of non-limiting example, the criterion may be configured in accordance with the following parameters or combinations thereof: ID update time threshold T3, type of request (e.g. read request, write request), permission associated with the LO, sequence of requests (e.g. first request, all requests, etc.). Accordingly, by way of non-limiting examples, a request may meet the ID update criterion if ID has not been modified for longer than T3, or if the request is "write" request and ID has not been modified for longer than T3, or if the request is first "write" request with "write" permission, etc. Update time threshold T3 may be configurable, and may be defined as dependent on protocol, type of LO, loading/processing considerations, etc. By way of non-limiting example, T3 may be defined as equal to modify time threshold (MTT), as a constant parameter (e.g. 10 sec for all LOs) or otherwise.

If the request meets the ID update criterion, the transformation system checks (504) if there are multiple open instances associated with the requested ID. If the requested instance is a single open instance associated with the respective ID (as illustrated in FIG. 5$a$), the transformation system suspends (505) the request, generates a new ID for the respective TLO and accordingly updates (506) ID in the header of said TLO by re-writing the header with new ID (referred to hereinafter as ID'). New ID' is generated in a manner substantially similar to generating ID when creating a transformed logical data object.

If there are one or more pending non-write requests for addresses to the same ID, the transformation system may complete its processing before handling the 1st write request or suspend the processing till successful updating of ID in the header.

Upon successful updating ID in the header, the transformation system further updates (507) the ID Map and processes (508) the suspended request(s).

It should be noted that in certain embodiments of the invention a number of instances associated with the requested ID may be a part of the ID update criterion. Accordingly in such embodiments the ID update criterion will not be satisfied and ID will not be updated if the requested instance is a single open instance associated with the respective ID.

If the requested instance is not a single open instance associated with the respective ID (as illustrated in FIG. 5b) and the intercepted request is the 1st write request addresses to any of the instances associated with the requested ID, the transformation system stops (509) processing related to all (if any) pending I/O requests corresponding to any of these instances, and generates a pending list. Alternatively, the transformation system may fulfill processing said requests or a part thereof before stopping (509) the processing. The pending list is adapted to handle non-finished I/O requests related to each such instance as well as all (if any) further intercepted access-related requests addressed to the same ID and obtained before operation 511.

The transformation system further generates a new ID for the respective TLO and accordingly updates (506) ID in the header of said TLO by re-writing the header with new ID'. Upon successful updating ID in the header, the transformation system further updates (507) the ID Map and disconnects (510) all instances associated with the old ID, apart from the requested instance. The transformation system further initiates (510) "read header" requests for all disconnected instances, and starts processing (511) the pending requests (including the intercepted 1st write request) upon successful reading the header(s) and obtaining respective ID(s). As a result of the "read header" process, some of the instances may become connected to the TLO with updated ID', while other instances will become connected to TLO(s) with the old ID, said TLO(s) to be opened by the "read header" process.

Upon intercepting "close LO" request from a certain client, the transformation system closes the respective instance. The transformation system checks if there are other open instances associated with the same ID. If there are no open instances related to the same session as the intercepted "close LO" request, the session manager facilitates closing the respective session. The logical object manager facilitates closing the logical data object if there are no any open instances associated with the respective ID.

Updating (507) ID map comprises adding new entry ID' and providing association between old and new entries. The entries and associations thereof are removed from ID Map upon closing the LO. In certain embodiments of the invention, the new entries may be kept in the ID Map for a certain configurable period of time after closing the LO, thus, for example, facilitating a caching process.

Figure 6:
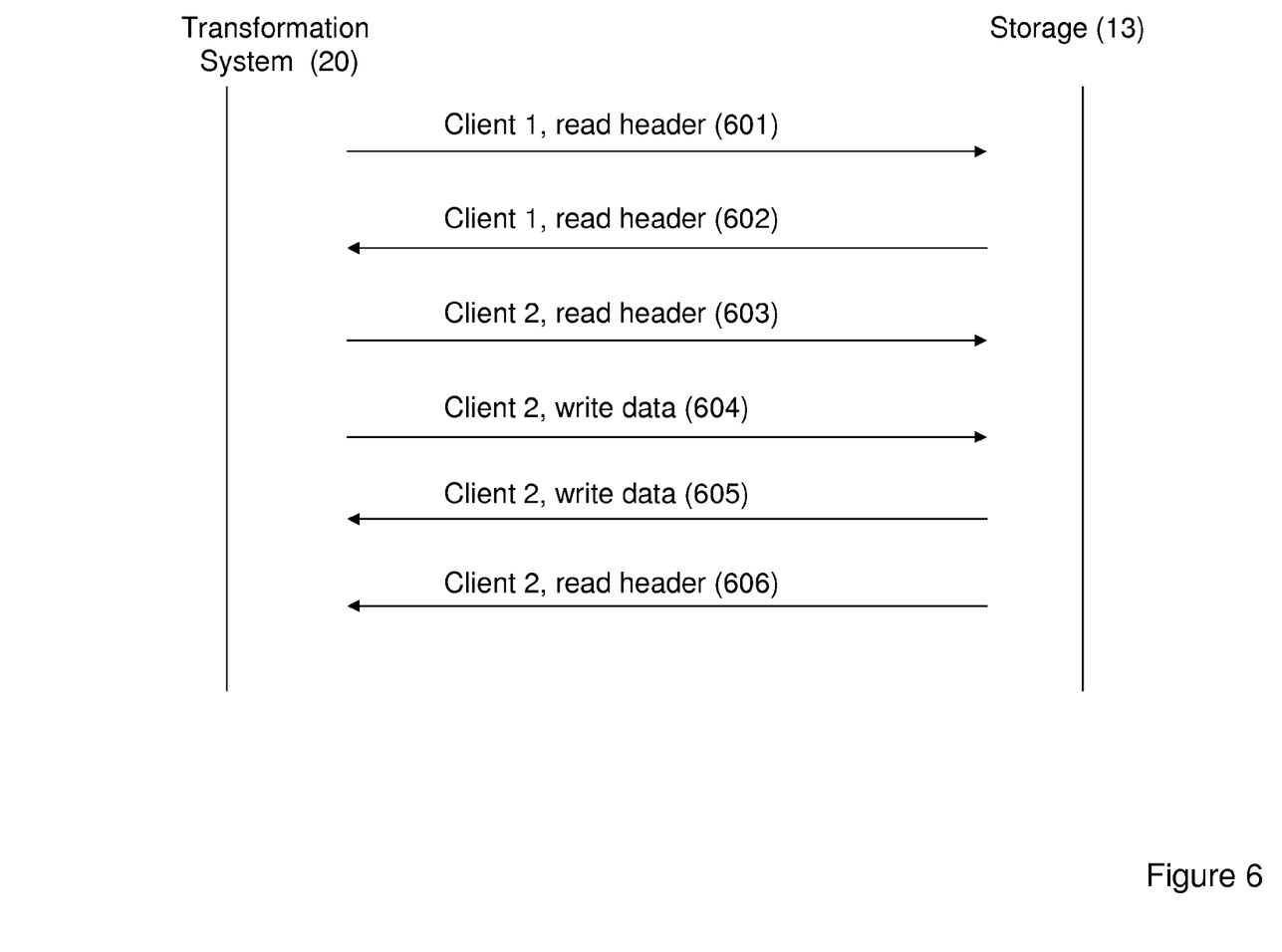
FIG. 6 illustrates an exemplified schematic scenario of communication between a transformation system and a storage device when handling multiple access-related requests in accordance with certain embodiments of the present invention.

The need to keep both IDs until closing the LO may be illustrated by the following generalized exemplified scenario illustrated in FIG. 6. Suppose that the requested instance is related to Client 1 and the transformation system requests (601) the storage device to read respective ID in the header of the stored LO. The transformation system receives (602) the respective ID per request of Client 1, intercepts 1st write request from Client 1 and, accordingly, sends header update request (604) to the storage device. Before sending header update request (604), the transformation system further intercepts the request to the same LO from Client 2 and sends (603) "read header" request to the storage device. As illustrated, the "read header" request from Client 2 has been sent to the storage device before actual header update (605) is received by the transformation system, but response (606) with requested ID has been received after the ID Map has been updated per received (605) new ID'. Accordingly, the transformation system needs to look for old ID entry and association between old and new ID entries in order to recognize that requests related to Client 2 (with old ID) and requests related to Client 1 (with new ID) are related to the same LO with updated ID.

In certain embodiments of the invention the ID Map is configured to comprise two data repositories referred to hereinafter as M1 and M2. Data repository M1 is configured to enable mapping between the most updated IDs and currently open LOs, while data repository M2 is configured to enable mapping old and new IDs corresponding to the currently open LOs.

For example, M1 may comprise the last updated ID entries corresponding to open LOs, information on open instances and associations thereof. M2 may comprise old and last updated ID entries corresponding to open LOs, and association thereof. Upon successful updating ID in the header, M1 will be updated as follows: a new entry ID' will be added to M1, old entry ID will be removed from M1 and the requested instance will be re-associated to ID'. M2 will be updated as follows: old entry ID will be kept in M2, a new entry ID' will be added to M2 together with association between the old and new entries.

Alternatively or additionally, M2 may comprise the last updated IDs related to currently open LOs and timestamps of the respective update. Each time a new file is opened, the transformation system issues a "read header" request, said request comprises ID of the requested LO and a timestamp of the request. If the respective ID is found in the M2, and the timestamp of the "read header" request is lower than the timestamp of the ID update in M2, the transformation system issues another "read header" request with accordingly updated timestamp and further compares the timestamps of the request and ID update. The transformation system repeats the process until the timestamp of "read header" request is newer then the timestamp of the last update of ID saved in M2, this "read header" request to be used for the further processing of the intercepted access request.

ID entries are removed from M1 and M2 upon closing the LO. Optionally, ID entries may be removed from M2 after a period corresponding to the time threshold T3. Optionally, ID entries may be kept in M1 after closing the LO, e.g. for caching purposes.

Among advantages of splitting the ID Map as described is improved performance of handling the intercepted requests and proper handling multi-client requests independently of internal order (e.g. as illustrated in FIG. 6) of requests/responses between the transformation system and the storage device.

As was detailed with reference to FIG. 3, there may be multiple concurrently opened instances actually related to different LOs, however associated with the same ID. Referring to non-limiting example illustrated in FIG. 3, we may assume, for illustration purposes only, that TLOs 32 and 33 have the same ID, access-related requests 30a and 30b are read requests to TLO 32, and 30c is write request to TLO 33 received during processing requests 30a and 30b and is the 1st write request received to the respective ID. Upon receiving the write request 30c, the transformation system generates the respective instance in a manner detailed with reference to FIG. 4 for a case of two non-matching LO with the same ID. As request 30c is the 1st write request received to the respective ID, the transformation system further checks that the request meets ID update criterion, and there are more than one open instances associated with the requested ID. In a manner detailed with reference to FIG. 5b, the transfer system stops processing related to requests 30a, 30b and 30c and generates the pending list comprising these requests. Alternatively, the transformation system may suspend request 30c and fulfill requests 30a and 30b. The transformation system further generates a new ID' for TLO 33 and updates the header of said TLO accordingly. Upon successful updating ID in the header, the transformation system disconnects instances 31a and 31b. The transformation system further initiates "read header" requests for disconnected instances 31a and 31b, reads the header of TLO 32 and obtains respective unchanged ID. The transformation system starts processing of pending requests (if any), while requests 30a and 30b correspond to TLO 32 with old ID and, and request 30c now corresponds to TLO 33 with new ID'. Thus, resulting from this process, instances corresponding to non-matching LOs are now associated with different IDs.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

The invention claimed is:

1. A method for operating an identification map associated with a transformation system operatively coupled to a plurality of clients and a storage device and configured to transform a plurality of logical data objects (LOs) including a plurality of identifiers (IDs) to a plurality of transformed logical data objects (TLOs) for storage in the storage device, the method comprising:

mapping, by a data repository, current IDs and currently open LOs;

receiving, by the storage device, new IDs associated with the currently open LOs;

mapping, by the data repository, the new IDs to the currently open LOs to generate a current mapping when the new IDs are received, the current IDs becoming old IDs when the new IDs are received;
removing, by the data repository, the mapping of the old IDs to the currently open LOs subsequent to receiving the new IDs;
mapping, by a different data repository, each old ID associated with each currently open LO to generate a past mapping;
mapping, by the different data repository, the current mapping, wherein:
the data repository stores the current mapping, and the different data repository stores the current mapping and the past mapping;
removing the current mapping from the data repository when a currently open LO becomes closed;
removing the current mapping and the past mapping from the different data repository after a period corresponding to a time threshold when the currently open LO becomes closed;
performing an input/output (I/O) request, wherein the I/O request comprises the ID of the currently open LO and a first timestamp of the request;
determining if the ID is found in the different data repository;
determining if the first timestamp is lower than a second timestamp of the ID in the different data repository;
issuing a read header request with an updated timestamp;
comparing the first timestamp and an updated ID in a header in the currently open LO;
repeating the issuing and comparing process until the updated timestamp is more recent than the second timestamp;
processing the I/O request when the updated timestamp is more recent than the second timestamp;
upon successful updating of the ID in the header, updating the data repository by adding a new entry ID related to the currently open LO in the data repository; and
removing an old entry ID related to the currently open LO from the data.

2. The method of claim 1, wherein mapping the new IDs and the currently open LOs comprises updating one of ID entries, data on open instances, and associations between the new IDs and the currently open LOs.

3. The method of claim 1, wherein mapping the old IDs and the new IDs comprises updating old ID entries and last ID entries corresponding to the currently open LOs.

4. The method of claim 3, wherein mapping the new IDs and the currently open LOs comprises updating one of ID entries, data on open instances, and associations between the new IDs and the currently open LOs.

5. The method of claim 1, wherein mapping the old IDs and the new IDs comprises: maintaining the old entry ID in the different data repository; adding the new entry ID to the different data repository; and associating the new entry ID and the old entry ID in the different data repository.

6. The method of claim 5, wherein mapping the old IDs and the new IDs further comprises recording, by the different data repository, a time stamp each time a ID related to each open LO is updated.

7. A storage system, comprising:
a storage device comprising a memory, a data repository and a different data repository; and
a transformation system comprising a processor operatively coupled to at least one client and the storage device, the transformation system configured to transform a logical data object (LO) to a transformed logical data object (TLO) for storage in the storage device operable with at least one storage protocol, wherein the processor is configured to:
map, in the data repository, current IDs and currently open LOs,
transmit, to the storage device, new IDs associated with the currently open LOs,
map, in the data repository, the new IDs to the currently open LOs to generate a current mapping when the new IDs are received, the current IDs becoming old IDs when the new IDs are received,
remove, from the data repository, the mapping of the old IDs to the currently open LOs subsequent to receiving the new IDs,
map, in the different data repository, each old ID associated with each currently open LO to generate a past mapping,
map, to the different data repository, the current mapping, wherein:
the data repository stores the current mapping, and the different data repository stores the current mapping and the past mapping,
remove the current mapping from the data repository when a currently open LO becomes closed,
remove the current mapping and the past mapping from the different data repository after a period corresponding to a time threshold when the currently open LO becomes closed,
perform an input/output (I/O) request, wherein the I/O request comprises the ID of the currently open LO and a first timestamp of the request,
determine if the ID is found in the different data repository,
determine if the first timestamp is lower than a second timestamp of the ID in the different data repository,
issue a read header request with an updated timestamp,
compare the first timestamp and an updated ID in a header in the currently open LO;
repeat the issuing and comparing process until the updated timestamp is more recent than the second timestamp,
process the I/O request when the updated timestamp is more recent than the second timestamp,
upon successful update of the ID in the header, update the data repository by adding a new entry ID related to the currently open LO in the data repository, and
remove and old entry ID related to the currently open LO from the data.

8. The system of claim 7, wherein, when mapping the new IDs and the currently open LOs, the processor is configured to update one of ID entries, data on open instances, and associations between the new IDs and the currently open LOs.

9. The system of claim 7, wherein, when mapping the old IDs and the new IDs, the processor is configured to update old ID entries and last ID entries corresponding to the currently open LOs.

10. The system of claim 9, wherein, when mapping the new IDs and the currently open LOs, the processor is configured to update one of ID entries, data on open instances, and associations between the new IDs and the currently open LOs.

11. The system of claim 7, wherein, when mapping the old IDs and the new IDs, the processor is further configured to: maintain the old entry ID in the different data repository; add the new entry ID to the different data repository; and associate the new entry ID and the old entry ID in the different data repository.

12. The system of claim 11, wherein, when mapping the old IDs and the new IDs, the processor is further configured to record, in the different data repository, a time stamp each time a ID related to each open LO is updated.

13. A computer program product comprising a computer useable memory including a computer readable program code embodied thereon for operating an identification map associated with a transformation system operatively coupled to a plurality of clients and a storage device and configured to transform a plurality of logical data objects (LOs) including a plurality of identifiers (IDs) to a plurality of transformed logical data objects (TLOs) for storage in the storage device, the computer program product comprising:

computer code for mapping, by a data repository, current IDs and currently open LOs;

computer code for receiving, by the storage device, new IDs associated with the currently open LOs;

computer code for mapping, by the data repository, the new IDs to the currently open LOs to generate a current mapping when the new IDs are received, the current IDs becoming old IDs when the new IDs are received;

computer code for removing, by the data repository, the mapping of the old IDs to the currently open LOs subsequent to receiving the new IDs;

computer code for mapping, by a different data repository, each old ID associated with each currently open LO to generate a past mapping;

computer code for mapping, by the different data repository, the new IDs and the current mapping, wherein:
the data repository stores the current mapping, and
the different data repository stores the current mapping and the past mapping;

computer code for removing the current mapping from the data repository when a currently open LO becomes closed;

computer code for removing the current mapping and the past mapping from the different data repository after a period corresponding to a time threshold when the currently open LO becomes closed;

computer code for performing an input/output (I/O) request, wherein the I/O request comprises the ID of the currently open LO and a first timestamp of the request;

computer code for determining if the ID is found in the different data repository;

computer code for determining if the first timestamp is lower than a seccond timestamp of the ID in the different data repository:

computer code for issuing a read header request with an updated timestamp;

computer code for comparing the first timestamp and an updated ID in a header in the currently open LO;

computer code for repeating the issuing and comparing process until the updated timestamp is more recent than the second timestamp;

computer code for processing the I/O request when the updated timestamp is more recent than the second timestamp;

upon successful updating of the ID in the header, computer code for updating the data repository by adding a new entry ID related to the currently open LO in the data repository; and computer code for removing an old entry ID related to the currently open LO from the data.

14. The computer program product of claim 13, wherein the computer code for mapping the new IDs and the currently open LOs comprises computer code for updating one of ID entries, data on open instances, and associations between the new IDs and the currently open LOs.

15. The computer program product of claim 13, wherein the computer code for mapping the old IDs and the new IDs comprises computer code for updating old ID entries and last ID entries corresponding to the currently open LOs.

16. The computer program product of claim 15, wherein the computer code for mapping the new IDs and the currently open LOs comprises computer code for updating one of ID entries, data on open instances, and associations between the new IDs and the currently open LOs.

17. The computer program product of claim 13, wherein the computer code for mapping the old IDs and the new IDs comprises:

computer code for maintaining the old entry ID in the different data repository; computer code for adding the new entry ID to the different data repository; and computer code for associating the new entry ID and the old entry ID in the different data repository.

18. The computer program product of claim 17, wherein the computer code for mapping the old IDs and the new IDs further comprises computer code for recording, by the different data repository, a time stamp each time a ID related to each open LO is updated.

* * * * *